US010223368B2

(12) United States Patent
Bhosale et al.

(10) Patent No.: US 10,223,368 B2
(45) Date of Patent: Mar. 5, 2019

(54) PREDICTIVE OBJECT TIERING BASED ON OBJECT METADATA

(71) Applicant: International Business Machines Corporation, Armonk, NY (US)

(72) Inventors: Nilesh Prabhakar Bhosale, Pune (IN); Dean Hildebrand, Bellingham, WA (US); William W. Owen, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 14/973,605

(22) Filed: Dec. 17, 2015

(65) Prior Publication Data

US 2017/0177638 A1 Jun. 22, 2017

(51) Int. Cl.
*G06F 17/30* (2006.01)
*G06F 3/06* (2006.01)

(52) U.S. Cl.
CPC .......... *G06F 17/301* (2013.01); *G06F 3/0649* (2013.01); *G06F 17/30221* (2013.01); *G06F 17/30589* (2013.01); *G06F 17/30607* (2013.01)

(58) Field of Classification Search
CPC ............. G06F 12/0246; G06F 12/0897; G06F 2212/214; G06F 2212/7204; G06F 2212/7208; G06F 17/30221; G06F 17/30592; G06F 17/301; G06F 17/30607; G06F 17/30589; G06F 3/0649; G11B 2220/45
See application file for complete search history.

(56) References Cited

U.S. PATENT DOCUMENTS

| 7,672,909 | B2 | 3/2010 | Meijer et al. | |
|---|---|---|---|---|
| 8,285,758 | B1 | 10/2012 | Bono et al. | |
| 8,577,824 | B2 | 11/2013 | Langen et al. | |
| 8,935,474 | B1 | 1/2015 | Todd et al. | |
| 2003/0065898 | A1* | 4/2003 | Flamma | G06F 3/0601 711/165 |
| 2009/0138481 | A1* | 5/2009 | Chatley | G06F 3/0613 |
| 2011/0035802 | A1 | 2/2011 | Arajujo, Jr. et al. | |
| 2011/0106863 | A1* | 5/2011 | Mamidi | G06F 17/30221 707/823 |
| 2012/0005209 | A1 | 1/2012 | Rinearson et al. | |

(Continued)

OTHER PUBLICATIONS

Gu, P. "Metadata and Data Management in High Performance File and Storage Systems," Huazhong University of Science and Technology dissertation, Summer Term 2008, pp. 1-124.

(Continued)

*Primary Examiner* — James E Richardson
(74) *Attorney, Agent, or Firm* — Zilka-Kotab, P.C.

(57) ABSTRACT

In one general embodiment, a computer-implemented method is provided. The computer-implemented method includes identifying a first object in a tiered storage system, and identifying first metadata associated with the first object. The computer-implemented method also includes identifying a second object utilizing the first metadata of the first object. The second object is associated with second metadata. Moreover, the computer-implemented method includes, in response to an access of the first object, modifying a heat value associated with the second object.

18 Claims, 7 Drawing Sheets

(56) References Cited

U.S. PATENT DOCUMENTS

| | | | |
|---|---|---|---|
| 2014/0059063 A1* | 2/2014 | Shimizu | G06F 17/30345 707/756 |
| 2014/0095802 A1* | 4/2014 | Lee | G06F 12/128 711/136 |
| 2014/0136782 A1 | 5/2014 | Thomas | |
| 2014/0289182 A1 | 9/2014 | Ramakrishnan et al. | |
| 2014/0324920 A1* | 10/2014 | Hamilton | G06F 17/30592 707/812 |
| 2015/0006538 A1* | 1/2015 | Koike | G06F 3/0486 707/740 |

OTHER PUBLICATIONS

Mell et al., "The NIST Definition of Cloud Computing: Special Publication 800-145," National Institute of Standards and Technology, Sep. 2011, 7 pages.

Mell et al., "The NIST Definition of Cloud Computing: Version 15," National Institute of Standards and Technology, Oct. 7, 2009, 2 pages.

NIST, "NIST Cloud Computing Program," NIST webpage, http://www.nist.gov/itl/cloud/, Nov. 13, 2013, 2 pages.

IBM Knowledge Center, "User storage pools," Jul. 22, 2015, pp. 1-3, Retrieved From http://www.ibm.com/support/knowledgecenter/en/SSFKCN_3.5.0/com.ibm.cluster.gpfs.v3r5.gpfs200.doc/bl1adv_userpool.htm.

* cited by examiner

PREDICTIVE OBJECT TIERING BASED ON OBJECT METADATA

BACKGROUND

The present invention relates to data storage systems, and more particularly, this invention relates to efficiently storing object data in a storage hierarchy.

Cloud storage is primarily comprised of object storage at a massive scale. In an object storage system, each data object is assigned a unique object identifier, and each object is associated with metadata. The metadata may comprise name/value pairs representing the data in an object, user defined descriptions, thumbnails, etc.

Tiered data storage provides a method for storing data hierarchically across multiple storage tiers, such as flash storage, disk storage, and tape storage. In other words, different categories of data may be assigned to different types of storage media based on levels of protection needed, performance requirements, frequency of use, etc. For example a database requiring high performance may be stored on higher tier storage media (with lowest latency), like SSDs; whereas archival data that is less frequently accessed, and tolerant to higher access latency, can be stored on cheaper storage media, such as tapes.

An individual object stored in a tiered data storage system may be tiered based on the metadata associated with the object. For example, the object may be stored to or moved to a particular storage tier based on a heat of the object.

SUMMARY

In one general embodiment, a computer-implemented method is provided. The computer-implemented method includes identifying a first object in a tiered storage system, and identifying first metadata associated with the first object. The computer-implemented method also includes identifying a second object utilizing the first metadata of the first object. The second object is associated with second metadata. Moreover, the computer-implemented method includes, in response to an access of the first object, modifying a heat value associated with the second object.

In another general embodiment, a computer program product is provided for performing predictive object tiering based on object metadata. The computer program product comprises a computer readable storage medium having program instructions embodied therewith. The program instructions are executable by a processor to cause the processor to identify a first object in a tiered storage system. Also, the program instructions are executable by the processor to cause the processor to identify first metadata associated with the first object. Moreover, the program instructions are executable by the processor to cause the processor to identify a second object utilizing the first metadata of the first object. The second object is associated with second metadata. Still yet, the program instructions are executable by the processor to cause the processor to, in response to an access of the first object, modify a heat value associated with the second object.

In another general embodiment, a system comprises a processor and logic integrated with and/or executable by the processor. The logic is configured to identify a first object in a tiered storage system. Further, the logic is configured to identify first metadata associated with the first object. Also, the logic is configured to identify a second object utilizing the first metadata of the first object. The second object is associated with second metadata. Moreover, the logic is configured to, in response to an access of the first object, modify a heat value associated with the second object.

Other aspects and embodiments of the present invention will become apparent from the following detailed description, which, when taken in conjunction with the drawings, illustrate by way of example the principles of the invention.

DETAILED DESCRIPTION

Figure 1:
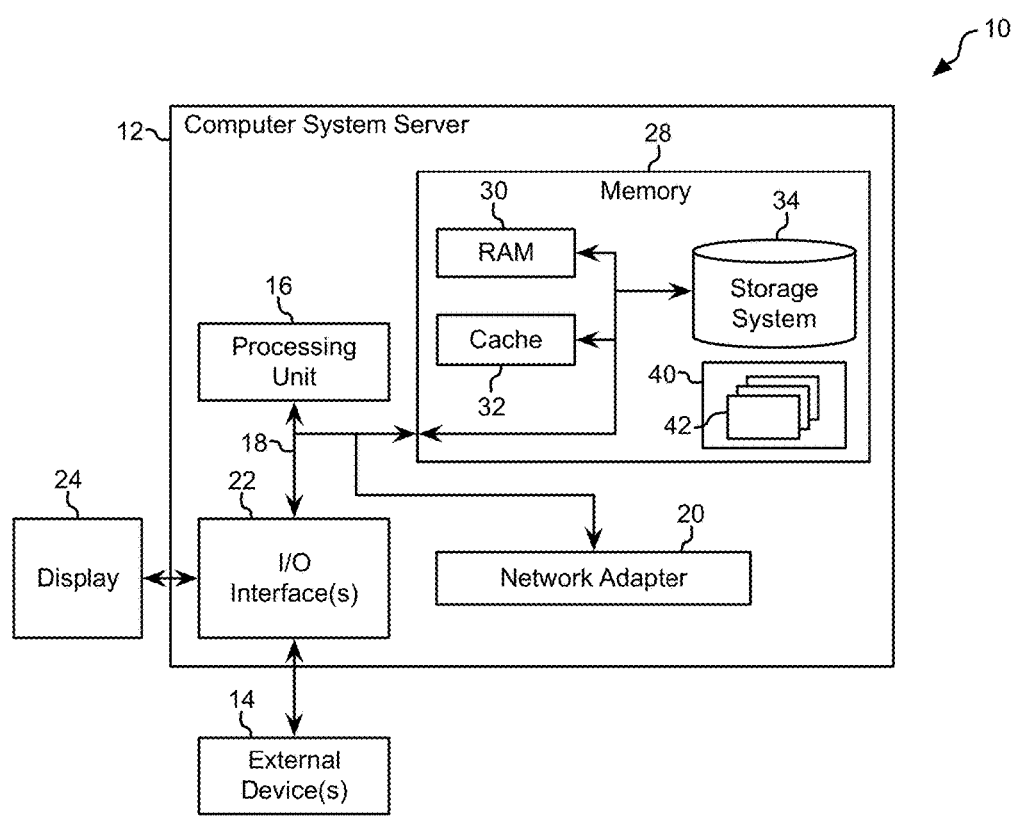
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of predictive object tiering based on object metadata.

In one general embodiment, a computer-implemented method is provided. The computer-implemented method includes identifying a first object in a tiered storage system, and identifying first metadata associated with the first object. The computer-implemented method also includes identifying a second object utilizing the first metadata of the first object. The second object is associated with second metadata. Moreover, the computer-implemented method includes, in response to an access of the first object, modifying a heat value associated with the second object.

In another general embodiment, a computer program product is provided for performing predictive object tiering based on object metadata. The computer program product comprises a computer readable storage medium having program instructions embodied therewith. The program instructions are executable by a processor to cause the processor to identify a first object in a tiered storage system. Also, the program instructions are executable by the processor to cause the processor to identify first metadata associated with the first object. Moreover, the program instructions are executable by the processor to cause the processor to identify a second object utilizing the first metadata of the first object. The second object is associated with second metadata. Still yet, the program instructions are executable by the processor to cause the processor to, in response to an access of the first object, modify a heat value associated with the second object.

In another general embodiment, a system comprises a processor and logic integrated with and/or executable by the processor. The logic is configured to identify a first object in a tiered storage system. Further, the logic is configured to identify first metadata associated with the first object. Also, the logic is configured to identify a second object utilizing the first metadata of the first object. The second object is associated with second metadata. Moreover, the logic is configured to, in response to an access of the first object, modify a heat value associated with the second object.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
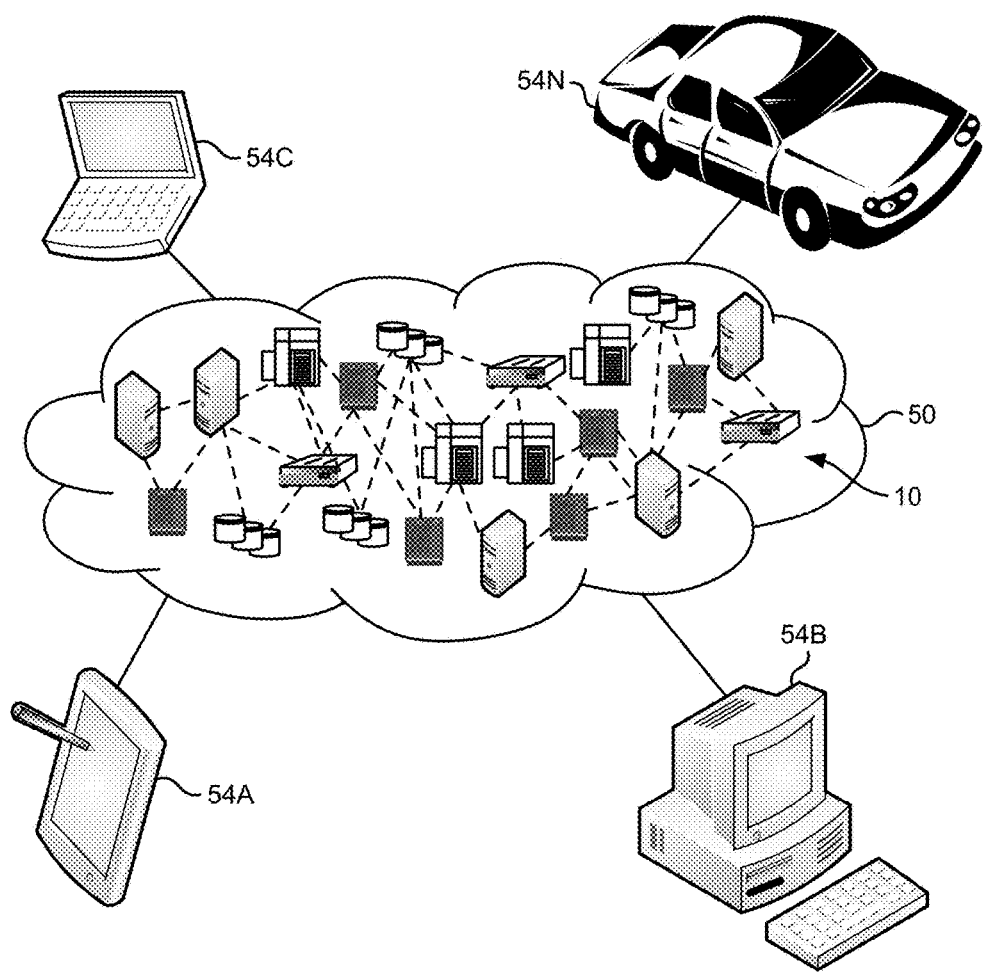
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
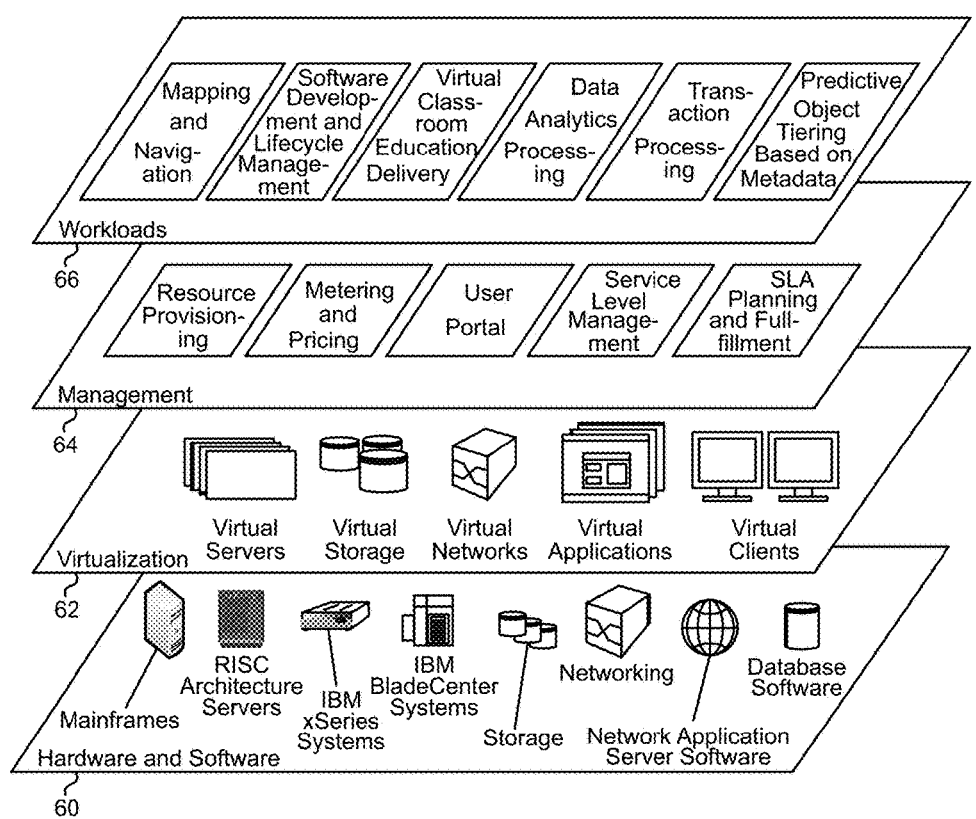
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; predictive object tiering based on object metadata; etc.

Figure 4:
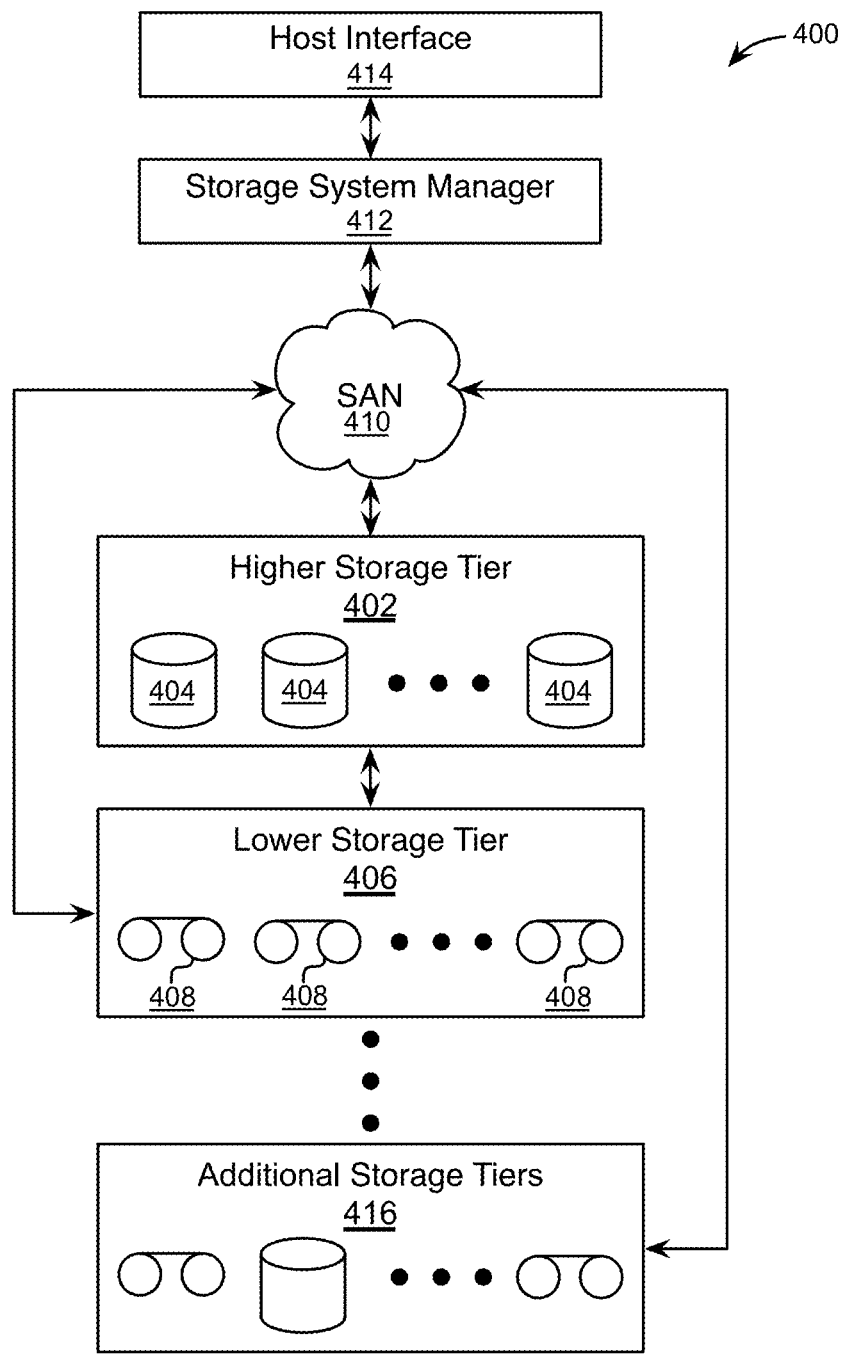
FIG. 4 depicts a tiered storage system, according to one embodiment.

Now referring to FIG. 4, a tiered storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network, such as a storage area network (SAN) 410, LAN, WAN or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system manager 412 may include logic configured to receive a request to open an object (e.g., access request, etc.), logic configured to determine if the requested object is stored to the lower storage tier 406 of the tiered data storage system 400, and logic configured to move the requested object to the higher storage tier 402.

Of course, this logic may be implemented as a method on any device and/or system or as a computer program product, according to various embodiments.

Figure 5:
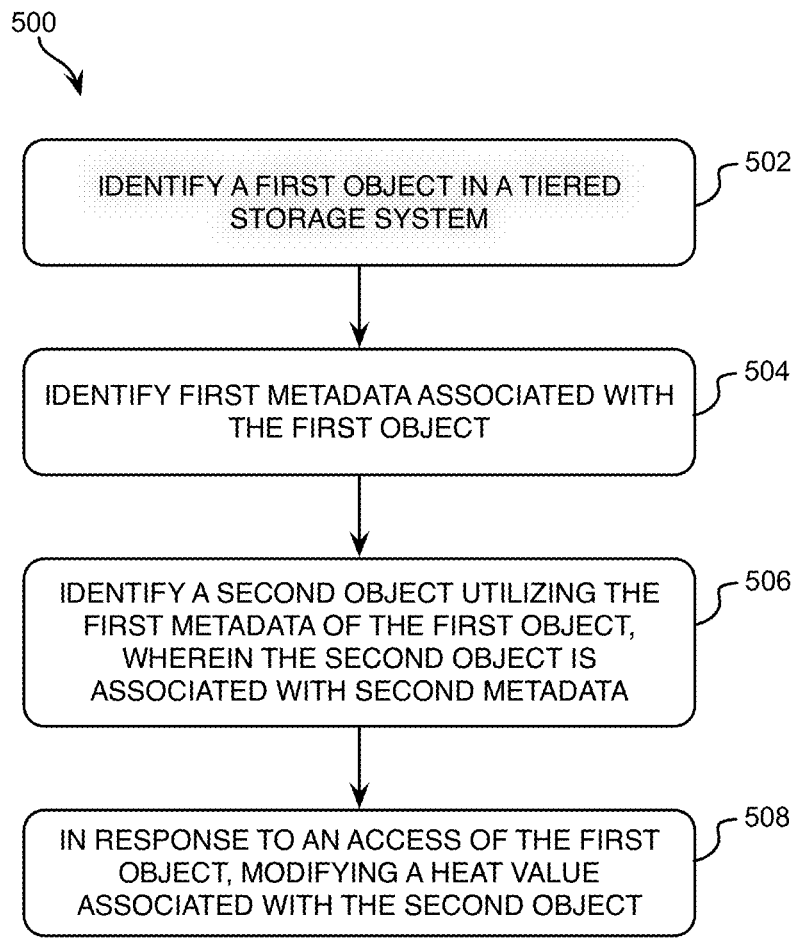
FIG. 5 depicts a method for predictive object tiering based on object metadata, according to one embodiment.

Now referring to FIG. 5, a flowchart of a method 500 for predictive object tiering based on object metadata, is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a storage system manager, a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, the method 500 may initiate with operation 502, where a first object in a tiered storage system is identified. As used herein, an object may include any discrete unit of data stored in a storage pool. The data may comprise user data, system data, etc. Further, although objects are herein discussed in a singular manner (e.g., a first object), it is understood that an object may include any grouping or association of one or more objects. In other words, the first object may include a set of objects, a container, an account, etc. Objects may be stored and/or retrieved from the tiered storage system by an application. As an option, the application may include an object storage platform, such as OpenStack Swift.

Still further, in various embodiments, the tiered storage system may include any storage system that includes two or more tiers of storage. For example, as described in the context of FIG. 4, a first tier in the tiered storage system may be characterized by a first service level, and a second tier in the tiered storage system may be characterized by a second service level that is greater than or less than the first level of service. As an option, each of the storage tiers may be associated with a different type of storage media. The types of storage media may be selected based on characteristics such as throughput, seek times, cost, archival reliability, etc. in a manner that most efficiently maximizes use of the tiered storage levels. For example, in one embodiment, a first storage tier may include solid state drives, a second storage tier may include fast hard disk drives, a third storage tier may include slow hard disk drives, and a fourth storage tier may include tape media. Of course, each of the tiers may be configured to include any of the aforementioned storage media.

In use, data that hasn't been accessed for a first threshold period (e.g., minutes, hours, days, weeks, months, etc.) of time may be moved from a first storage tier to a second storage tier, such as, for example, from flash storage to disk storage. Further, data that hasn't been accessed for a second threshold period (e.g., hours, days, weeks, months, etc.) may be moved from the second storage tier to a third storage tier, such as, for example, from the disk storage to tape storage. While movement based on access is common, other movement criteria might be used. Thresholds for moving data between storage tiers may be configured within data management policies. As noted above, each of the storage tiers may have very different performance characteristics, latency characteristics, throughput characteristics, and cost points.

Accordingly, identifying the first object in the tiered storage system may include any operation determines the presence of, locates, or finds the first object stored to a tier of the tiered storage system.

Additionally, at operation 504, first metadata associated with the first object is identified. As used herein, metadata that is associated with an object includes any information that describes the object (i.e., contents of the object, etc.), or may be used to locate the object. For example, the metadata may include one or more of access control lists (ACLs), file type, file size, time stamps, and user defined attributes, such as extended file system attributes. For example, the metadata may include brief user defined descriptions, thumbnails, an access history, etc. As an option, the metadata may comprise one or more key and value pairs. Moreover, the metadata may comprise one or more tags.

Further, at operation 506, a second object is identified utilizing the metadata of the first object. The second object is associated with second metadata. In one embodiment, the second object is stored in the same tiered storage system as the first object.

In various embodiments, the second object is identified utilizing the metadata of the first object and metadata of the second object. As an option, the second object may be identified by identifying metadata of the second object includes one or more values that are the same as, or similar to, values included in the metadata of the first object. For example, the second object may be identified because the metadata of the first object and second object identifies the first object and second object as being created by the same user on the same date. As another example, the second object may be identified because the metadata of the first object and second object identifies the first object and second object as being created by the same user within a predefined span of time (e.g., a day, a week, a month, etc.). As yet another example, the second object may be identified because the metadata of the first object and second object identifies the first object and second object as being created by the same user from within the same geographic region. As another example, the second object may be identified because the metadata of the first object and second object includes the same tags, keywords, user defined descriptions, time stamps (e.g., creation date, modification date, etc.), etc. As still yet another example, the second object may be identified because the metadata of the first object and second object identifies the first object and second object as sharing a similar access history.

Of course, such examples may be combined in any manner. Further, the second object may be identified in any feasible manner, and the above examples should not be construed as limiting the present disclosure in any way.

In one embodiment, the tiered storage system may determine a relationship between the first object and the second object based on the first metadata and the second metadata. The relationship may be a function of commonality, such as, for example, shared values, between the first and second metadata. The relationship may factor in a number of the shared values between the first and second metadata. Further, the relationship may be calculated such that some metadata keys and/or values may be weighted greater than others. As an option, a degree-of-relationship between a first object and a second object may be determined utilizing the first and second metadata associated with the first object and second object, respectively In some embodiments, the second object may be identified during a scheduled scan of a file system of the tiered storage system. In other embodiments the second object may be identified during a scan that occurs whenever an object is accessed (e.g., read, created, modified, etc.). Moreover, in some embodiments, the relationships between objects may be tracked in a data structure. For example, the relationships between objects may be tracked in a graph, a table, etc. As an option, each of the objects may be indexed in a database that tracks relationships (e.g., degree-of-relationships, etc.) between the related objects based on metadata. The information in this database may thereafter be utilized to increase or decrease the heat of the related objects when a particular object moves up or down within the storage tiers, as described in more detail below.

Still yet, at operation 508, in response to an access of the first object, a heat value associated with the second object is modified. As used herein, the access of an object may include any operation that examines or obtains a content of the first object. For example, the access of the first object may include an HTTP GET request, or any other request, that results in a content of the object being read and provided to a requesting client. Of course, the access of an object may include a request to write, a request to modify, a request to copy, etc. the object.

In various embodiments, each object may be associated with a heat value. The heat value may comprise any measurement that may be incremented and/or decremented. For example, the heat value may comprise an integer or decimal. Still yet, the heat value may comprise a binary value. Thus, modifying the heat value associated with the second object may include increasing or decreasing the heat value associated with the second object.

In one embodiment, the heat of an object may be calculated based on the number of times the object is accessed. For example, the more a given object is accessed, the greater the heat value is that is associated with the object. In another embodiment, the heat of an object may be calculated based on the time of times the object is accessed for a given period of time. The tier of storage that an object is stored to may be based on the heat associated with the object. Accordingly, movement of an object to a new storage tier may be triggered when the heat value of the object crosses above, or falls below, a particular heat threshold. For example, if an object crosses an X % of a heat threshold, the object may be automatically moved to a SSD-based storage tier. In one embodiment, the heat associated with each object is calculated and maintained by the storage system. As an option, the storage system may include IBM Spectrum Scale For Object, which is configured to provide object tiering based on associated heat values.

Accordingly, the heat value of each object may be utilized to determine which tier of the tiered storage system that the object is stored to. As an option, each tier may be associated with a threshold heat value. For example, a first tier may be associated with a first threshold heat value, and a second tier may be associated with a second threshold heat value. In such an example, objects with a heat value greater than or equal to the first threshold heat value may be stored to the first tier, and objects with a heat value greater than or equal to the second threshold heat value may be stored to the second tier. As an option, the thresholds may be configured by a user, such as an administrator.

In this manner, the heat values of a pool of objects may be utilized to optimize the storage of the pool of objects within a tiered storage system. A tiered storage policy may enforce the migration of hotter files to higher tiers, and colder files to lower. As one option, the heat value of an object may comprise an exponential moving average of the accesses to the object. As an object is accessed, the heat value of the object increases; when the access to the object slows or stops, the heat value of the object decreases. As an option, only instances of object access by a user may contribute to the heat value of the object (i.e., system operations, such as indexing, file listings, filesystem operations, etc. do not impact heat values).

Accordingly, based on the heat value of the first object, the first object may be moved to a higher tier to reduce future access latency of the first object. In other words, based on the access of the first object, the tiered storage system may move the first object from a first tier of storage to a second tier of storage. Moreover, because of the modification of the heat value associated with the second object, the second object may be moved to a higher tier to reduce the future access latency of the second object. In other words, based on the modified heat value associated with the second object, the tiered storage system may move the second object from a third tier of storage to a fourth tier of storage based.

In some embodiments, the first tier of storage may be the same as the third tier of storage. Further, the second tier of storage may be the same as the fourth tier of storage. In this way, the first and second objects may be together moved between the same tiers of storage in a tiered storage system. In other embodiments, the first tier of storage may be different than the third tier of storage, such that the first and second objects are moved in concert to/from different tiers of storage. Accordingly, one or more other objects may be moved between tiers of a tiered storage system based on an access of a first object.

In various embodiments, a relationship between two objects, or a degree-of-relationship between the two objects, may be used to compute the modification, in response to the access of the first object, of the heat value associated with the second object. In other words, a relationship or degree-of-relationship between a first object and a second object may be used for determining the appropriate degree of heat/temperature adjustment (i.e., the modification to the heat value) to the second object in response to an access to the first object.

Figure 6:
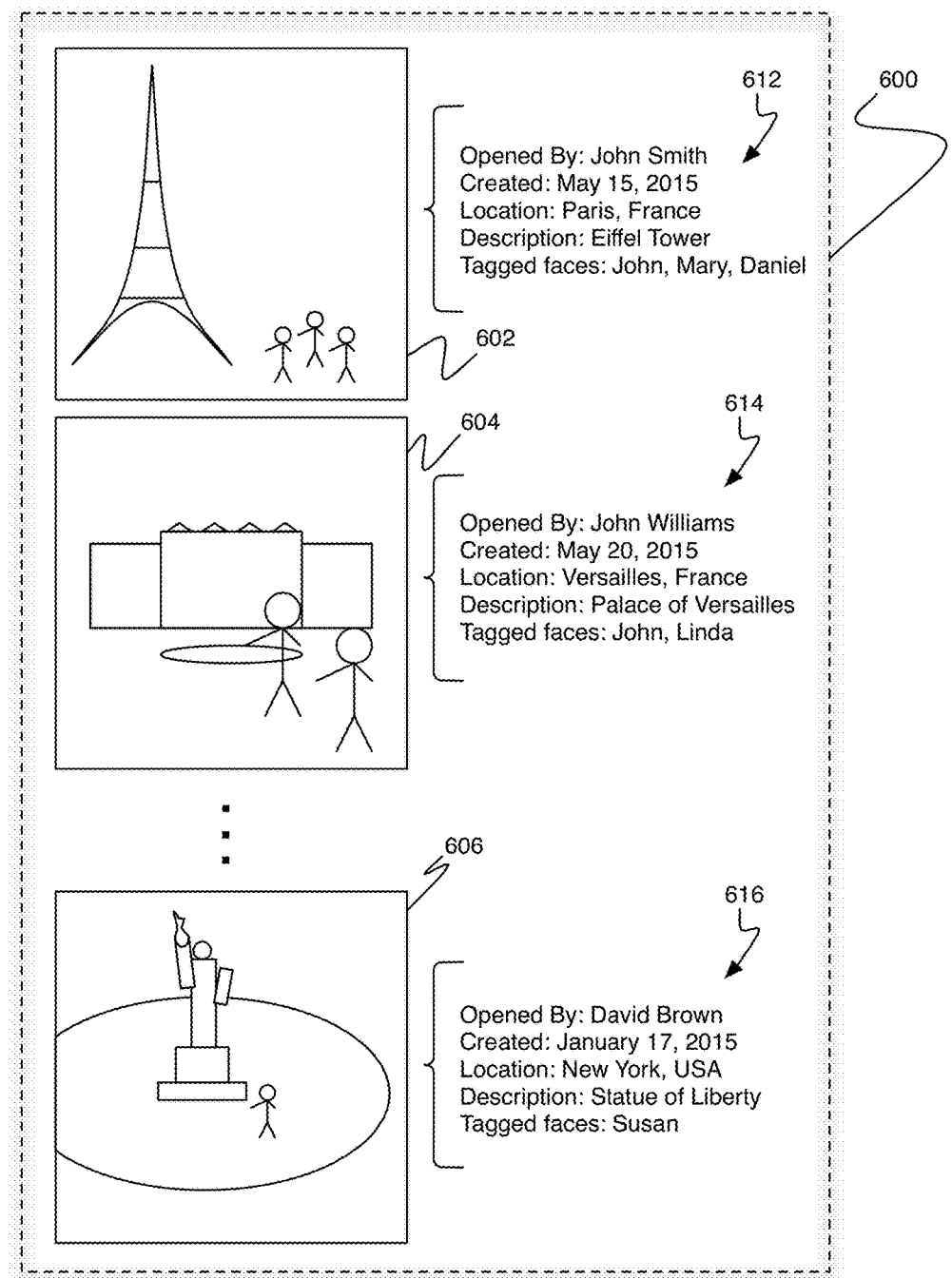
FIG. 6 depicts a tiered storage system, according to one embodiment.

For example, FIG. 6 depicts a tiered storage system 600 storing objects with varying relationships, in accordance with one embodiment. As an option, the tiered storage system 600 may be implemented in conjunction with features from any other embodiment listed herein, such as those described with reference to the other FIGS. Of course, however, such tiered storage system 600 and others presented herein may be used in various applications and/or in permutations which may or may not be specifically described in the illustrative embodiments listed herein. Further, the tiered storage system 600 presented herein may be used in any desired environment.

The tiered storage system 600 is illustrated to store a plurality of objects. Specifically, the tiered storage system 600 is illustrated as storing object 602, object 604, and object 606. For the sake of simplicity, the objects 602-606 are described as comprising three images, such as, for example, three photographs. However, it is understood that the methods and systems described in the context of FIG. 6 are equally applicable to any other object type that may be stored in a tiered storage system, as well as any number of objects that may be stored in a tiered storage system.

In addition, the tiered storage system 600 stores, for each of the objects 602-606, metadata. Specifically, the tiered storage system 600 is shown to store metadata 612 for the object 602, metadata 614 for the object 604, and metadata 616 for the object 606. Each instance of the metadata 612-616 is shown to include 5 fields. In particular, each instance of the metadata 612-616 is shown to include, for the object that the instance of metadata is associated with: a last user to access the object (i.e., "Opened By"), a datestamp of object creation (i.e., "Created"), a geographic location of object creation (i.e., "Location"), object tags or a textual description (i.e., "Description"), and people identified or tagged as being shown in the image that comprises the object (i.e., "Tagged faces").

Specifically, the metadata 612 indicates that the image comprising the object 602 was created on May 15, 2015 in Paris, France, and is associated with the description of "Eiffel Tower." Further, the metadata 612 indicates that the image comprising the object 602 was last opened by John Smith, and that John, Mary, and Daniel have been tagged or identified as being depicted within the image comprising the object 602. Similarly, the metadata 614 indicates that the image comprising the object 604 was created on May 20, 2015 in Versailles, France, and is associated with the description of "Palace of Versailles." Further, the metadata 614 indicates that the image comprising the object 604 was last opened by John Williams, and that John and Linda have been tagged or identified as being depicted within the image comprising the object 604. Finally, the metadata 616 indicates that the image comprising the object 606 was created on Jan. 17, 2015 in New York, USA, and is associated with the description of "Statue of Liberty." Further, the metadata 616 indicates that the image comprising the object 606 was last opened by David Brown, and that Susan has been tagged or identified as being depicted within the image comprising the object 606.

Based on the metadata 612-616 various relationships between the objects 602-606 may be identified. For example, the image comprising the object 602 was captured during the same predefined time period (i.e., one week span), in the same geographic region (i.e., country), and includes one or more of the same people (i.e., John), as the image comprising the object 604. As a result, a relationship, or degree-of-relationship, may be established between object 602 and the object 604. Further, the relationship between the object 602 and the object 604 may be utilized to determine a convection of heat (i.e., head value adjustment) from one of the objects to the other object when one of the objects is accessed.

In contrast, the image comprising the object 606 was created months prior to the creation of either of the objects 602 and 604; the object 606 was created in a different geographic location than where either of the objects 602 and 604 were created (i.e., France); and the image comprising the object 606 includes Susan, who doesn't appear in the photos captured in France. Accordingly, because based on the metadata 612-616 no relationship exists between the object 606 and either of the objects 602 and 604, an access of the object 606 does not cause the modification of a heat value associated with either of the object 602 or the object 604.

In other words, a relationship may be established between one or more objects based the common metadata key/value pairs shared between the objects. As the heat for a particular object increases (e.g., it is being accessed more frequently and/or recently), then the heat of other objects may also increased in proportion with how closely related the other objects are to the particular object. In this manner, the heat of a first object may convect or transfer to one or more related second objects.

In various embodiments, if an application in communication with an object storage system is configured to accept user-defined metadata values for a fixed set of application-defined keys (e.g., tags, etc.) in a particular format, then the determination of relationships between objects may be augmented. Moreover, if the object storage system can infer the data type of metadata tags, it can more deeply evaluate the relationships between objects. For example, in the context of FIG. 6, if the object storage system is configured to recognize that the "Created" key is a date, the system may utilize metrics, such as same week, within 7 days, same month, within 30 days, same year, within 365 days, etc. to determine the degree-of-relationship between objects. Similarly, if the object storage system is configured to recognize that the "Location" key is a geo-spatial location (e.g., providing geographic co-ordinates of the location), the system may utilize same location (e.g., within some distance range), same city, same country, etc. to determine the degree-of-relationship between objects. The degree-of-relationship between objects may be used to determine how much heat is transferred from one object to another object.

Although the objects 602, 604, and 606 of FIG. 6 are described to comprise images, it is understood that the objects may comprise any type of object that may be stored to an object storage system. Further, metadata associated with an object may comprise any metadata that may be utilized to describe the associated object. For example, the metadata may include, a topic, a responsible party, a language, a character set, a lineage, a title, a format, an identifier, a representation type, extent information, a facility, an instrument, a coverage, a resolution, ownership rights, a sample rate, a bit rate, a duration, a size, a kind, associated software, a volume, a number of channels, a dimensionality, a date added, a date modified, etc.

In some embodiments, weights may be used to determine a relationship between two or more objects. In other words, weights may be used to determine how closely two objects are related.

Figure 7:
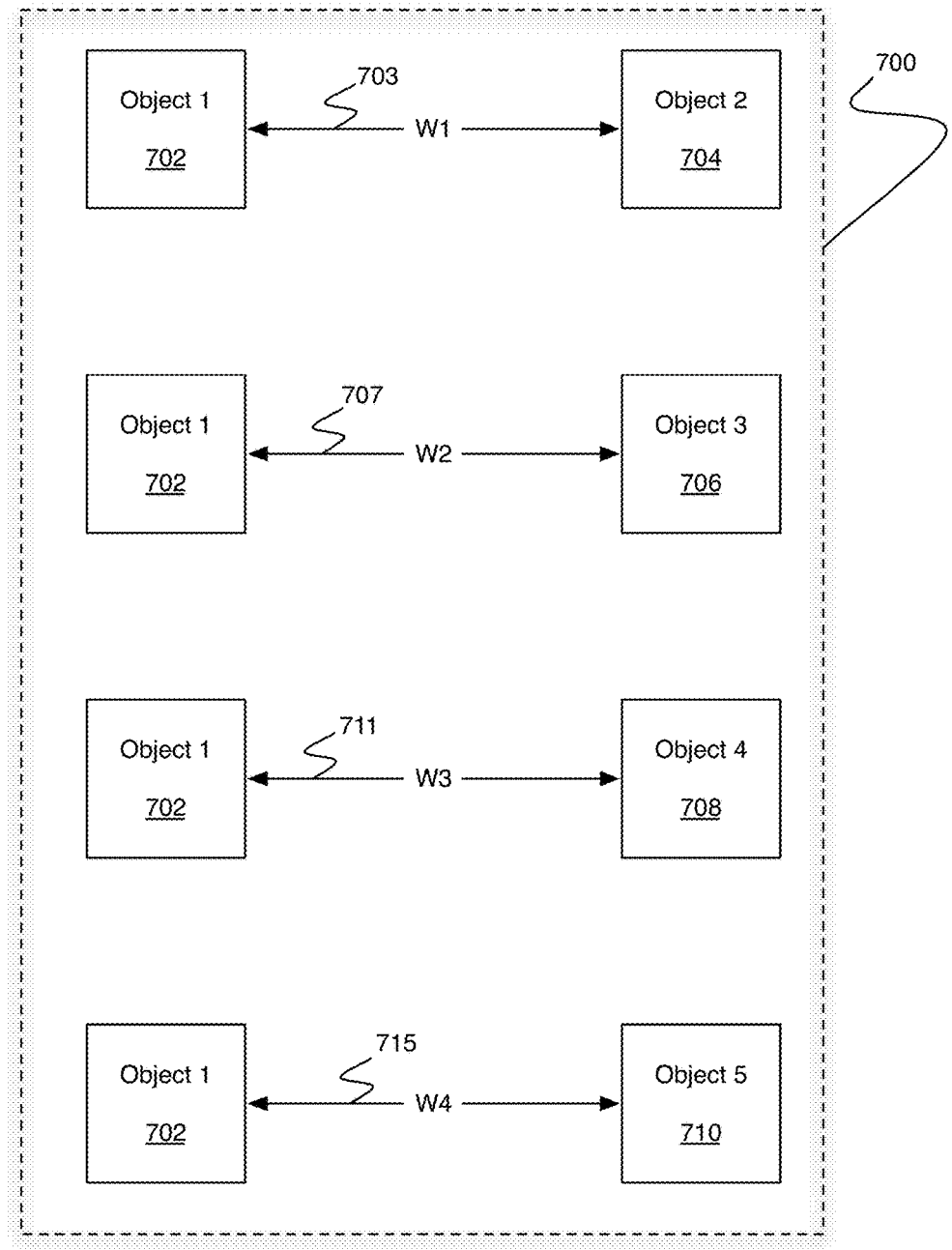
FIG. 7 depicts a tiered storage system, according to one embodiment.

For example, FIG. 7 depicts a tiered storage system 700 storing objects with varying relationships, in accordance with one embodiment. As an option, the tiered storage system 700 may be implemented in conjunction with features from any other embodiment listed herein, such as those described with reference to the other FIGS. Of course, however, such tiered storage system 700 and others presented herein may be used in various applications and/or in permutations which may or may not be specifically described in the illustrative embodiments listed herein. Further, the tiered storage system 700 presented herein may be used in any desired environment.

In one embodiment, whenever there is an exact match between the values of a particular metadata key, an influence of 1 may be assigned. Moreover, when there is not an exact match between the values of a particular metadata key, but the values are related to certain extent (e.g., "Paris" and "France" are related, or "May 15th" and "May 20th" are related, etc.), then an influence less than 1 (e.g., 0.5, 0.3, etc.) may be assigned. An influence of 1 may result in the second object heating up by 1 unit, and an influence of 0.5 may result in the second object being heated up by 0.5 units for each of the limited or partial matches.

In another embodiment, weights may be tracked between objects in a tiered storage system. For example, referring to FIG. 7, each of a second object 704, a third object 706, a fourth object 708, and a fifth object 710 have been identified as being related to a first object 702. In particular, the relationship between the second object 704 and the first object 702 is associated with a first weight 703; the relationship between the third object 706 and the first object 702 is associated with a second weight 707; the relationship between the fourth object 708 and the first object 702 is associated with a third weight 711; and the relationship between the fifth object 710 and the first object 702 is associated with a fourth weight 715.

Each of the weights 703, 707, 711, and 715 may indicate a degree-of-relationship between the respective objects. Moreover, each of the weights 703, 707, 711, and 715 may be associated with, or mapped to, a predetermined percentage of heat transference.

For example, the first weight 703 may result in 100% of the heat value adjustment to the first object 702 (e.g., due to access of the first object 702, etc.) being transferred to the second object 704. In other words, if a given access of the first object 702 results in a heat value associated with the first object 702 being adjusted by some value X, then a heat value associated with the second object 704 is likewise adjusted by 100% of X.

Similarly, the second weight 707 may result in 75% of the heat value adjustment to the first object 702 (e.g., due to access of the first object 702, etc.) being transferred to the third object 706. In other words, if a given access of the first object 702 results in a heat value associated with the first object 702 being adjusted by some value X, then a heat value associated with the third object 706 is adjusted by 75% of X. Also, the third weight 711 may result in 50% of the heat value adjustment to the first object 702 (e.g., due to access of the first object 702, etc.) being transferred to the fourth object 708. Still yet, the fourth weight 715 may result in 25% of the heat value adjustment to the first object 702 (e.g., due to access of the first object 702, etc.) being transferred to the fifth object 710.

Accordingly, in such an example, for a given access of the first object 702 that results in a modification of the heat value of the first object 702 by a value of +10, a heat value associated with the second object 704 may be incremented by +10, a heat value associated with the third object 706 may be incremented by +7.5, a heat value associated with the fourth object 708 may be incremented by +5, and a heat value associated with the fifth object 710 may be incremented by +2.5. As a result of incrementing the heat values associated with the objects 704, 706, 708, and 710, one of more of the heat values may exceed a heat threshold, and consequently one or more of the respective objects 704, 706, 708, and 710 may be moved to a different storage tier.

Although the relationships between objects have been described in the context of FIG. 7 to result heat transference percentages that are multiples of 25%, it is understood that any heat transference percentage values may be used (e.g., 5%, 15%, 23%, 88%, etc.). The heat transference percentage values may be configured by a user, such as an administrator. Further, the heat transference percentage values may be configured based on various rules, policies, goals, etc.

In one embodiment, a degree-of-relationship between two objects may be based on synonymous values in metadata of the objects. For example, if a first object is tagged with a metadata value of "soil," and a second object is tagged with a metadata value of "suelo" (i.e., "soil" in Spanish), then the degree-of-relationship between the two object may be determined to be high (e.g., 1, 100%, etc.). Similarly, if another object is tagged with "mud," then the degree-of-relationship with the "suelo" and "soil" tagged objects may be determined to be moderate, and consequently heat transfer between the objects may be moderate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying first metadata associated with a first object in a tiered storage system, the first metadata including a plurality of details of a creation of the first object;
   identifying second metadata associated with a second object in the tiered storage system, the second metadata including a plurality of details of a creation of the second object;
   comparing the first metadata to the second metadata;
   calculating a weight corresponding to a degree-of-relationship between the first object and the second object, based on the comparing, where the weight is calculated based on an amount of matching values between the first metadata and the second metadata;
   identifying an adjustment of a heat value of the first object by a first amount;
   adjusting a heat value of the second object by a second amount, based on the weight; and
   conditionally moving the second object to a different storage tier within the tiered storage system, based on a comparison of the heat value of the second object to a heat threshold.

2. The computer-implemented method of claim 1, wherein the first metadata includes:
   an identification of a user that created the first object,
   a time of the creation of the first object,
   a date of the creation of the first object, and
   a geographic location of the creation of the first object.

3. The computer-implemented method of claim 1, wherein the first object includes an image, and the first metadata further includes:
   a last user to access the first object,
   a textual description of the first object, and
   one or more people tagged as being shown in the image.

4. The computer-implemented method of claim 1, further comprising conditionally moving the first object to the different storage tier within the tiered storage system, based on a comparison of the heat value of the first object to the heat threshold.

5. The computer-implemented method of claim 1, further comprising assigning the weight to a relationship between the first object and the second object, wherein:
   the weight corresponds to a predetermined percentage of heat transference,
   the weight has a value of 1 in response to determining an exact match between the first metadata and the second metadata, and
   the second amount is a percentage of the first amount, the percentage matching the predetermined percentage of heat transference corresponding to the weight.

6. The computer-implemented method of claim 1, wherein the weight has a value less than 1 in response to determining that the first metadata and the second metadata are not an exact match, but are related to a predetermined extent.

7. The computer-implemented method of claim 1, wherein:
   the weight is further calculated based on an amount of matching synonymous values between the first metadata and the second metadata, and
   the heat value of the first object is associated with a number of times the first object is accessed within the tiered storage system.

8. The computer-implemented method of claim 1, wherein the first object includes an image, and the first metadata includes:

an identification of a user that created the first object,
a time of the creation of the first object,
a date of the creation of the first object,
a geographic location of the creation of the first object,
a last user to access the first object,
an access history of the first object,
one or more keywords,
a textual description of the first object, and
one or more people tagged as being shown in the image.

9. The computer-implemented method of claim 1, wherein the first metadata further includes one or more keywords, one or more user defined descriptions of the first object, and an access history of the first object.

10. The computer-implemented method of claim 1, further comprising indexing the first object and the second object in a database that tracks a relationship between the first object and the second object.

11. A computer program product for performing predictive object tiering based on object metadata, the computer program product comprising a computer readable storage medium having program instructions embodied therewith, the program instructions executable by a processor to cause the processor to:
   identify, by the processor, first metadata associated with a first object in a tiered storage system, the first metadata including a plurality of details of a creation of the first object;
   identify, by the processor, second metadata associated with a second object in the tiered storage system, the second metadata including a plurality of details of a creation of the second object;
   compare, by the processor, the first metadata to the second metadata;
   calculate, by the processor, a weight corresponding to a degree-of-relationship between the first object and the second object, based on the comparing, where the weight is calculated based on an amount of matching values between the first metadata and the second metadata;
   identify, by the processor, an adjustment of a heat value of the first object by a first amount;
   adjust, by the processor, a heat value of the second object by a second amount, based on the weight; and
   conditionally move, by the processor, the second object to a different storage tier within the tiered storage system, based on a comparison of the heat value of the second object to a heat threshold.

12. The computer program product of claim 11, wherein the first metadata includes:
   an identification of a user that created the first object,
   a time of the creation of the first object,
   a date of the creation of the first object, and
   a geographic location of the creation of the first object.

13. The computer program product of claim 11, wherein the first object includes an image, and the first metadata further includes:
   a last user to access the first object,
   a textual description of the first object, and
   one or more people tagged as being shown in the image.

14. The computer program product of claim 13, further comprising comparing conditionally moving, by the processor, the first object to the different storage tier within the tiered storage system, based on a comparison of the heat value of the first object to the heat threshold.

15. The computer program product of claim 11, wherein the weight has a value of 1 in response to determining an exact match between the first metadata and the second metadata.

16. The computer program product of claim 11, further comprising assigning the weight to a relationship between the first object and the second object, wherein:
   the weight corresponds to a predetermined percentage of heat transference,
   the weight has a value less than 1 in response to determining that the first metadata and the second metadata are not an exact match, but are related to a predetermined extent, and
   the second amount is a percentage of the first amount, the percentage matching the predetermined percentage of heat transference corresponding to the weight.

17. The computer program product of claim 11, wherein:
   the weight is further calculated based on an amount of matching synonymous values between the first metadata and the second metadata, and
   the heat value of the first object is associated with a number of times the first object is accessed within the tiered storage system.

18. A system, comprising:
   a processor; and
   logic integrated with the processor, executable by the processor, or integrated with and executable by the processor, the logic being configured to:
      identify first metadata associated with a first object in a tiered storage system, the first metadata including a plurality of details of a creation of the first object;
      identify second metadata associated with a second object in the tiered storage system, the second metadata including a plurality of details of a creation of the second object;
      compare the first metadata to the second metadata;
      calculate a weight corresponding to a degree-of-relationship between the first object and the second object, based on the comparing, where the weight is calculated based on an amount of matching values between the first metadata and the second metadata;
      identify an adjustment of a heat value of the first object by a first amount;
      adjust a heat value of the second object by a second amount, based on the weight; and
      conditionally move the second object to a different storage tier within the tiered storage system, based on a comparison of the heat value of the second object to a heat threshold.

* * * * *